(12) United States Patent
Giesler et al.

(10) Patent No.: US 6,318,958 B1
(45) Date of Patent: Nov. 20, 2001

(54) AIR TURBINE STARTER WITH SEAL ASSEMBLY

(75) Inventors: William Lee Giesler, Phoenix; Jack Moy; Kellan Geck, both of Chandler; Charles Jon Alten, Scottsdale, all of AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/370,675

(22) Filed: Aug. 9, 1999

Related U.S. Application Data
(60) Provisional application No. 60/097,467, filed on Aug. 21, 1998.

(51) Int. Cl.[7] .................................................. F04D 11/02
(52) U.S. Cl. .......................... 415/112; 415/111; 415/113; 415/122.1; 415/230; 415/231
(58) Field of Search .................................. 415/110, 111, 415/168.1, 168.2, 173.5, 174.2, 174.3, 174.5, 124.1, 122.1, 170.1, 112, 113, 123, 174.4, 230, 231; 60/625, 626; 277/348, 352, 390, 412, 415

(56) References Cited

U.S. PATENT DOCUMENTS

| | | |
|---|---|---|
| 1,773,067 | 8/1930 | Ver Planck . |
| 1,878,731 | 9/1932 | Thompson . |
| 2,907,595 * | 10/1959 | Benson et al. ..................... 415/174.4 |
| 3,235,269 | 2/1966 | Olesen . |
| 3,302,951 | 2/1967 | Olesen . |
| 3,796,507 * | 3/1974 | Smykal et al. ........................ 415/111 |
| 3,799,559 * | 3/1974 | Kayser ................................. 277/390 |
| 3,904,211 * | 9/1975 | Dega ................................. 415/170 A |
| 3,989,407 * | 11/1976 | Cunningham ........................ 415/123 |
| 4,099,727 | 7/1978 | Weiler . |
| 4,156,342 | 5/1979 | Korta et al. . |
| 4,189,156 | 2/1980 | Geary, Jr. et al. . |
| 4,193,603 | 3/1980 | Sood . |
| 4,257,617 | 3/1981 | Hill . |
| 4,997,340 * | 3/1991 | Zinsmeyer et al. ................... 415/111 |
| 5,003,767 * | 4/1991 | Rodgers ............................ 60/39.141 |
| 5,042,963 | 8/1991 | Sorensen et al. . |
| 5,129,782 * | 7/1992 | Ruetz ................................... 415/111 |
| 5,160,005 | 11/1992 | Burch . |
| 5,412,977 | 5/1995 | Schmohl et al. . |
| 5,454,689 | 10/1995 | Falavigna . |
| 5,489,190 | 2/1996 | Sullivan . |
| 5,538,258 | 7/1996 | Hager et al. . |
| 5,619,850 | 4/1997 | Palmer et al. . |
| 5,692,756 * | 12/1997 | Altieri ................................. 277/348 |

FOREIGN PATENT DOCUMENTS

| | | | |
|---|---|---|---|
| 651921-A * | 4/1951 | (GB) .................................. 415/230 |
| 59-117957-A * | 7/1984 | (JP) .................................... 277/348 |

* cited by examiner

Primary Examiner—Christopher Verdier
(74) Attorney, Agent, or Firm—Keith Newburry, Esq.

(57) ABSTRACT

An air turbine starter with an improved seal assembly disposed between the turbine and the housing is provided. The seal assembly comprises a face seal, a non-contacting seal axially spaced therefrom to define an air filled annular chamber therebetween and a flow passage having an exit fluidly communicating with said chamber and an inlet fluidly communicating with a source of air.

23 Claims, 10 Drawing Sheets

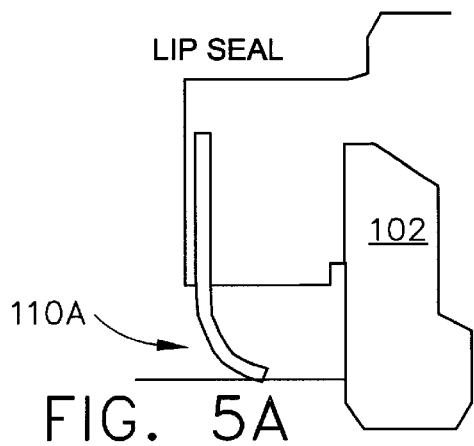
FIG. 5A LIP SEAL
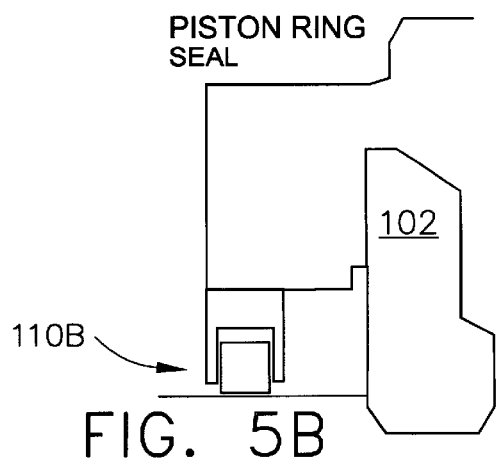
FIG. 5B PISTON RING SEAL
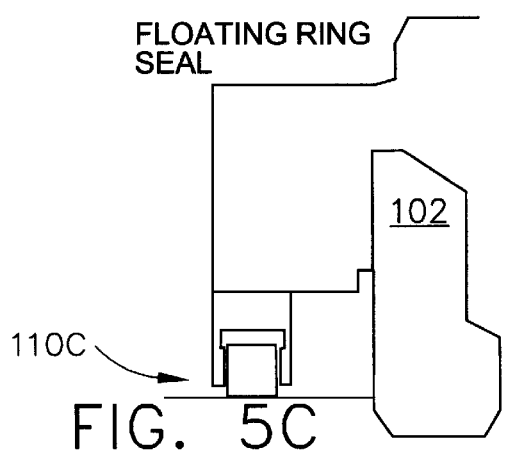
FIG. 5C FLOATING RING SEAL
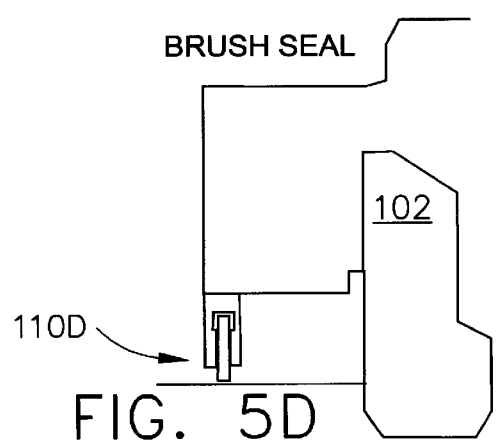
FIG. 5D BRUSH SEAL
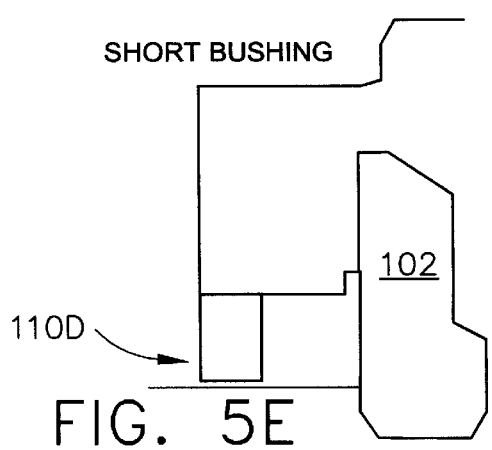
FIG. 5E SHORT BUSHING
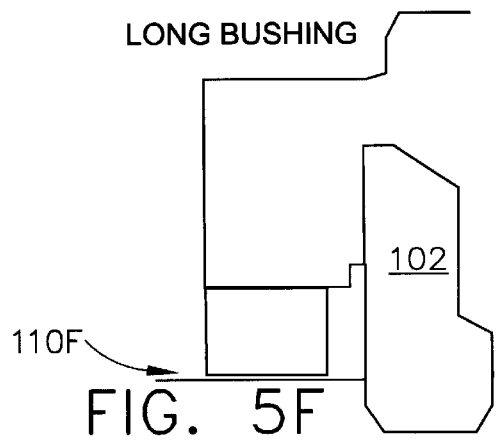
FIG. 5F LONG BUSHING

AIR TURBINE STARTER WITH SEAL ASSEMBLY

CROSS REFERENCE TO RELATED APPLICATION

Priority is claimed to provisional application Ser. No. 60/097,467, filed Aug. 21, 1998.

TECHNICAL FIELD

This invention relates generally to air turbine starters and in particular to seals used in such starters.

BACKGROUND OF THE INVENTION

Referring to the drawings, FIG. 2 shows a prior art turbine face seal commonly used in air turbine starters. The face seal includes a rotor 2 mounted to shaft 24 adjacent a bearing 26. The rotor 2 has an axially facing flange 3. The face seal further includes a stator 4 mounted to turbine exhaust housing 27. Disposed between the rotor 2 and the stator 4 is a carbon seal ring 5 that sealingly engages the flange 3.

In typical air turbine starters such the ATS 100 shown in FIG. 1, the rotation of the turbine wheel 22 can generate under certain circumstances a low pressure or "vacuum" on the downstream side of the wheel which is also the airside of the turbine seal. This differential pressure results in large oil leakage rates if the turbine seal has any flaws or coke build up in the contact zone. The coke build-up destroys the flatness of the sealing contact surfaces between the rotor and the seal carbon ring. The coke separates the two surfaces resulting in a clearance therebetween. As a result an air/oil mist is pulled from the bearings through the seal and into the turbine exhaust air. If 100 to 300 ccs of oil is displaced to the turbine exhaust air without detection by the pilot or ground crew, loss of the air turbine starter by turbine bearing failure is possible. This sensitivity of the system design to turbine seal flaws results in the turbine seal being in the top three causes of air turbine starter returns from the field for cause.

Accordingly, there is a need for a turbine seal for use in air turbine starters that prevents oil leakage even in the presence of a coke build up.

SUMMARY OF THE INVENTION

An object of the present invention is to provide for a turbine seal for use in air turbine starters that prevents oil leakage even in the presence of coke build up.

The present invention achieves this object by providing an air turbine starter with an improved seal assembly disposed between the turbine and the housing. The seal assembly comprises a face seal, a non-contacting seal axially spaced therefrom to define an air filled annular chamber therebetween and a flow passage having an exit fluidly communicating with said chamber and an inlet fluidly communicating with a source of air.

The air filled chamber acts as a buffer separating the differential pressure generated by pumping of the turbine from the face seal. Thus if the face seal develops a flaw (due to coke build up on the contact face or grain pull out from the carbon face) the seal leakage is low even if the sealing faces separate.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 5A–5F show various air-to-air seal arrangements.

DESCRIPTION OF THE PREFERRED EMBODIMENT

Figure 1:
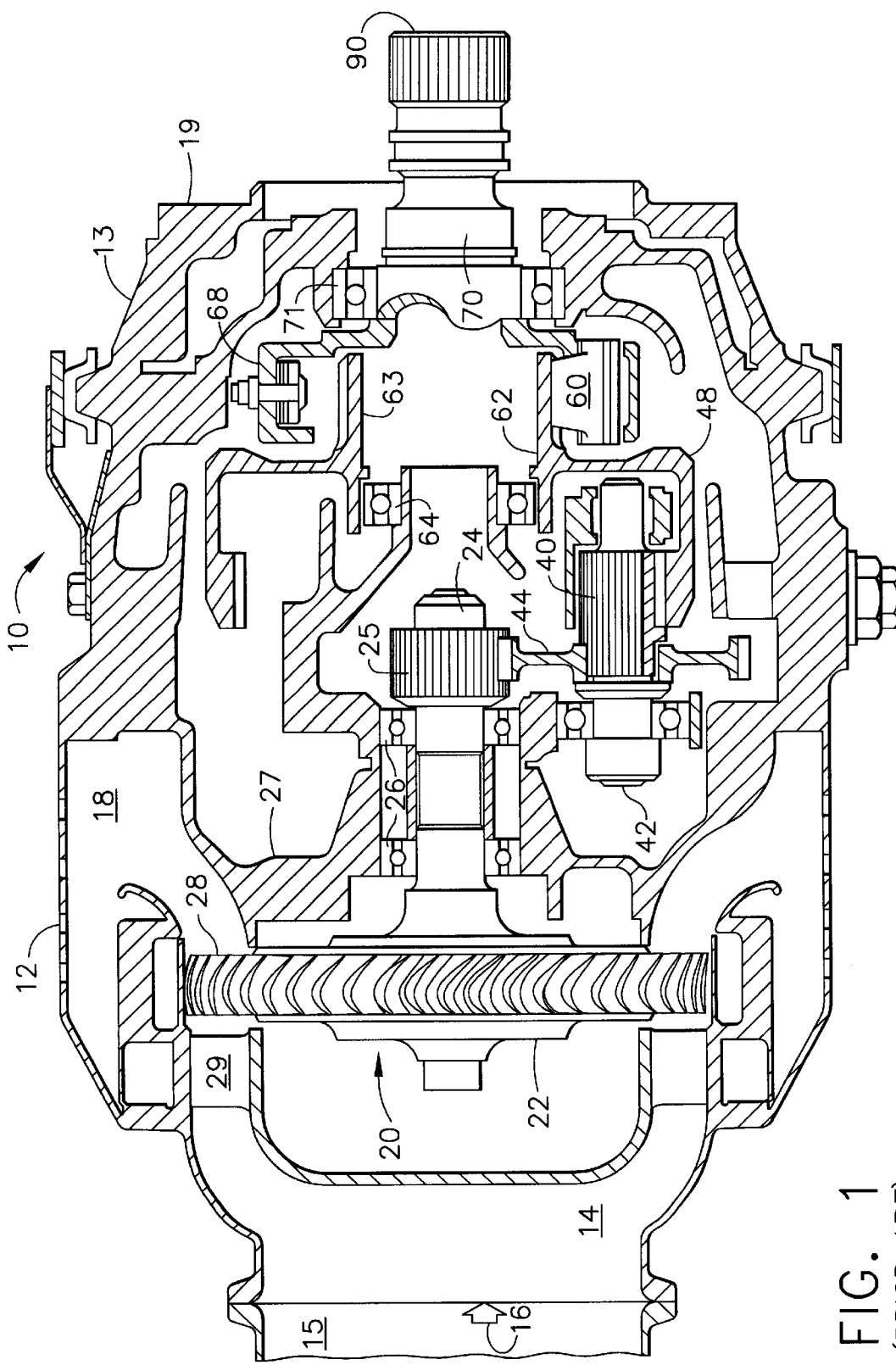
FIG. 1 presents a plan cross-sectional view of an Allied-Signal air turbine starter having the designation ATS 100.
Figure 2:
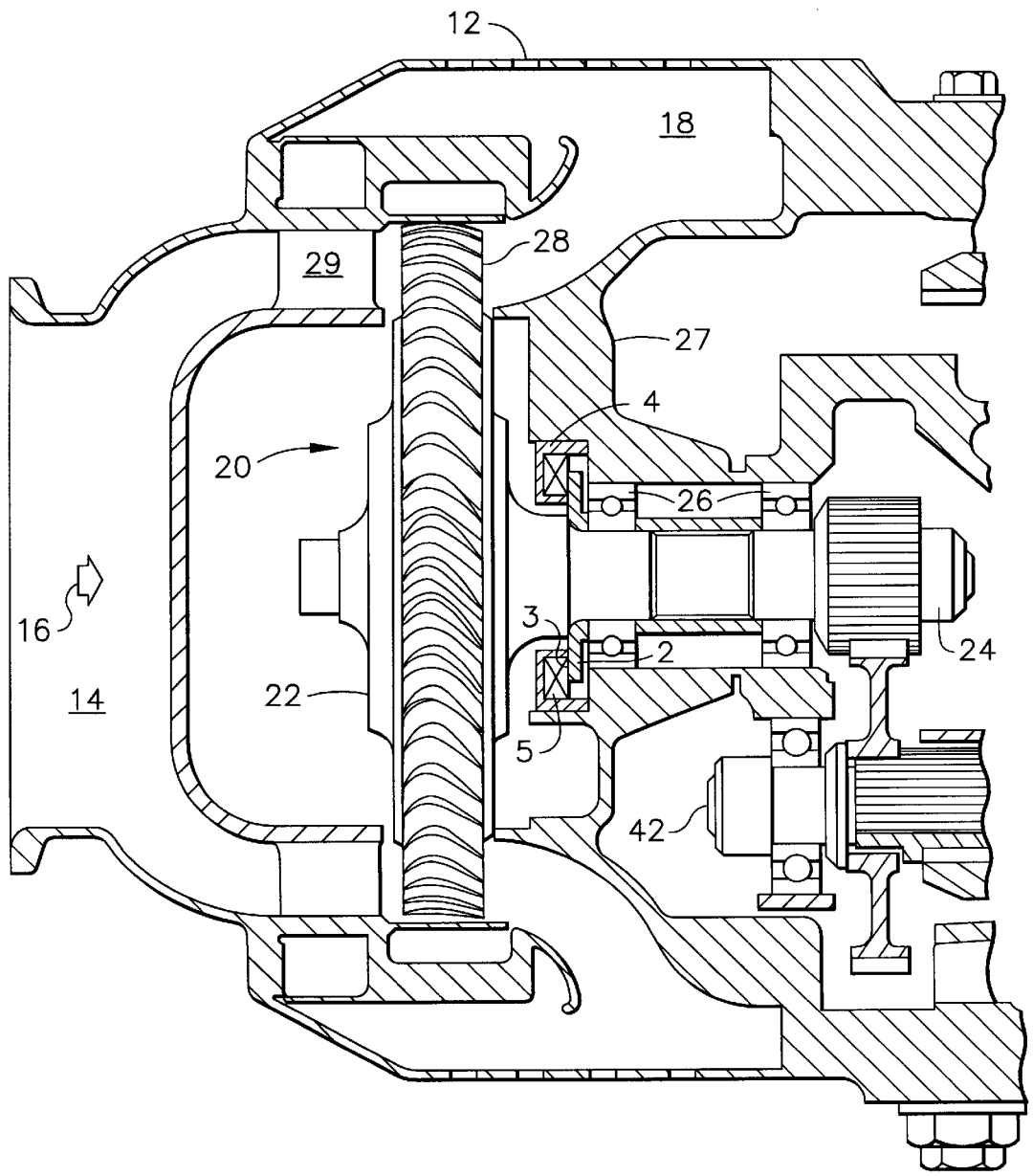
FIG. 2 is a blow-up of the turbine section of the air turbine starter of FIG. 1 with a prior art turbine seal.

Referring to the drawings, FIG. 1 shows an air turbine starter 10 embodying the present invention. The air turbine starter 10 has a first housing assembly 12 and a second housing assembly 13. The housing assembly 12 defines a flow path 14 extending from an inlet 16 to an outlet 18. The housing assembly 13 includes a mounting flange 19 for mounting the air turbine starter to an aircraft engine (not shown). An air pressure duct 15 delivers pressurized air from an air supply to the inlet 16. Typically, the air pressure at the inlet 16 is in the range of 30–40 psig.

Within the air turbine starter 10, the housing assemblies 12 and 13 support a turbine section 20, a compound planetary gear train 40, and an overrunning clutch 60.

The turbine section 20 is comprised of a turbine wheel 22 having a rotatable shaft 24 extending therefrom, journaled by bearings 26 to a turbine exhaust housing 27 which is part of housing 12. A gear 25 is secured to the shaft 24. A plurality of turbine blades 28 are circumferentially mounted to the turbine wheel 22 and are positioned within the flow path 14. Upstream of the blades 28 are a plurality of nozzles 29 mounted to the housing assembly 12 which provide the proper flow angle to the air flow before it enters the turbine blades 28. In operation, pressurized air entering through inlet 16 is properly aligned by the nozzles 29 and is then expanded across the blades 28 before exiting through outlet 18. The blades 28 convert the pressure energy of the air into rotary motion causing the turbine wheel 22, the shaft 24 and the gear 25 to rotate at the same speed as the blades 28.

The compound planetary gear train 40 is comprised of a plurality of shafts 42 each having a gear 44 that meshes with the gear 25. The gear 44 engages a portion of the shaft 42, a ring gear 48 and a hub gear 62 which is the input side of the overrunning clutch 60. In operation, the gear train 40 converts the high speed, low torque output of the turbine section 20 into low speed, high torque input for the clutch 60.

The clutch 60 is a pawl and ratchet type clutch. The clutch 60 has the hub gear 62 on its input side and a clutch drive shaft 70 on its output side. The hub gear 62 has a hollow cylindrical hub portion 63 which is supported on a bearing 64 and has a ratchet 65 circumferentially positioned along its external surface. Adjacent to the hub gear 62 is a hollow drive shaft assembly comprising a clutch housing 68 integral with a clutch drive shaft 70, and mounted on bearing 71 for rotation. A portion of the drive shaft 70 extends beyond the housing 13 and has an air turbine starter output shaft 90 mounted thereon. The output shaft 90 can be coupled, for example, to a starter pad on the gearbox of a gas turbine engine, (not shown).

Figure 3:
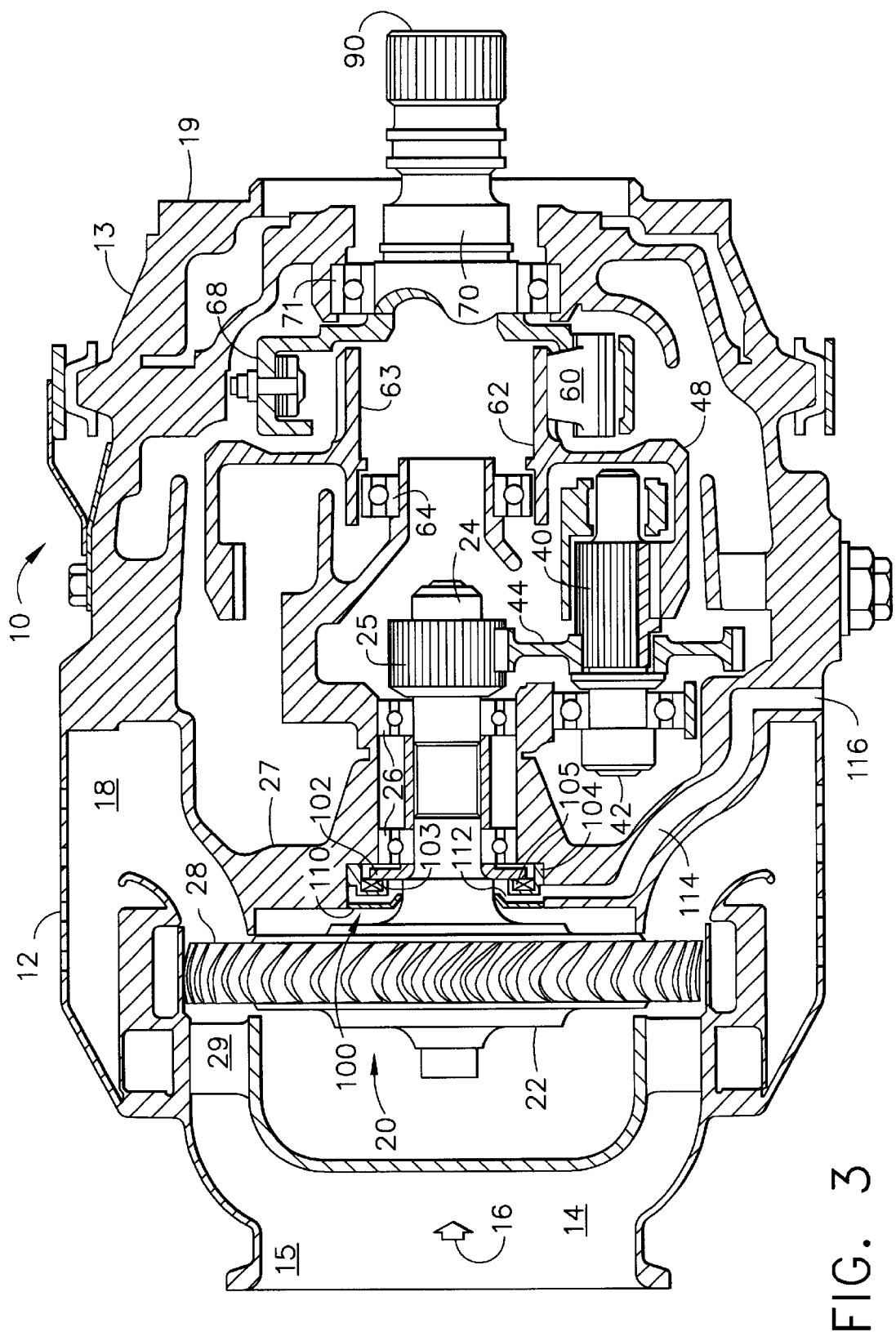
FIG. 3 is a blow-up of the turbine section of the air turbine starter of FIG. 1 with a turbine seal contemplated by the present invention.
Figure 3A:
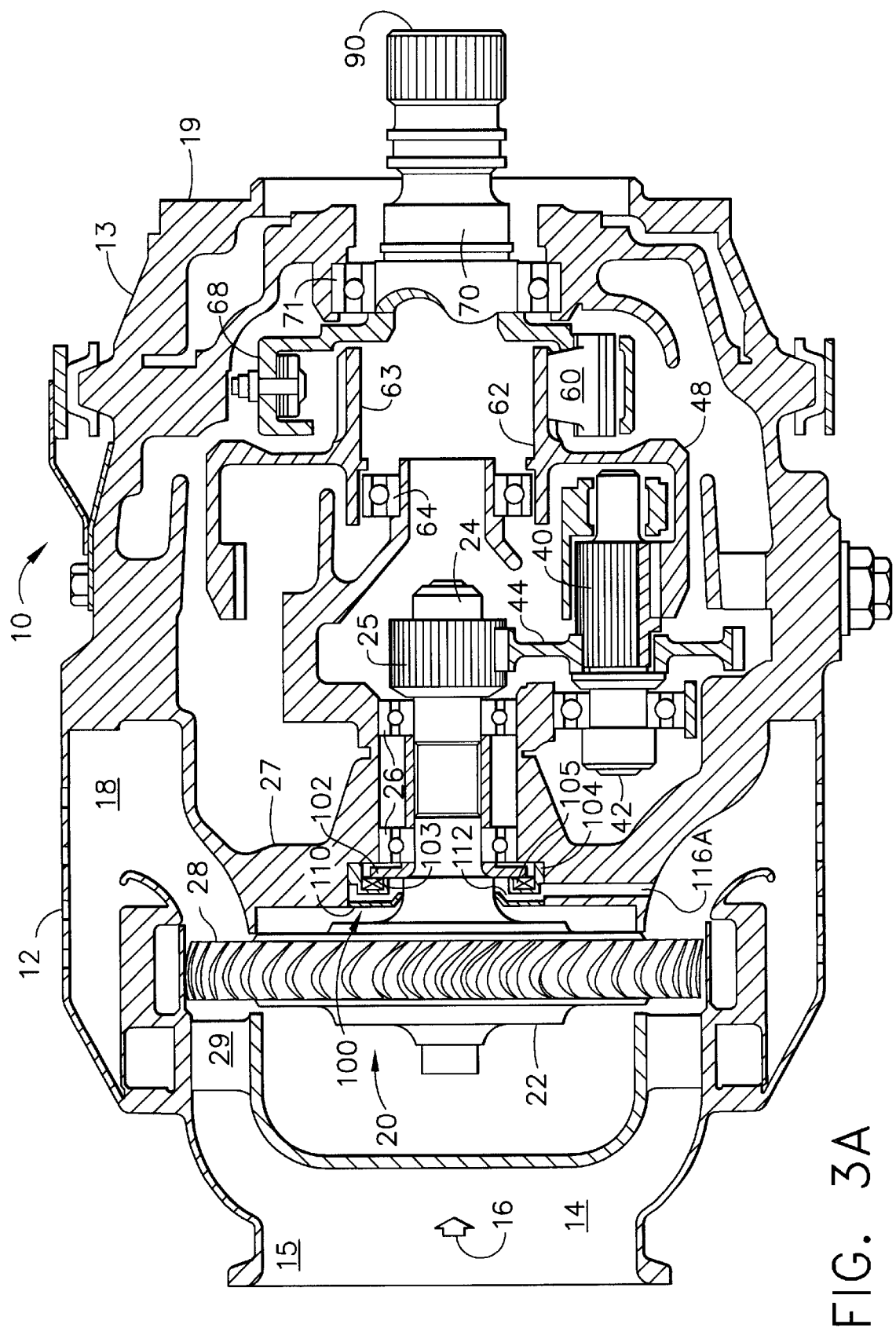
FIG. 3A–3E show various flow passage inlet arrangements.
Figure 3B:
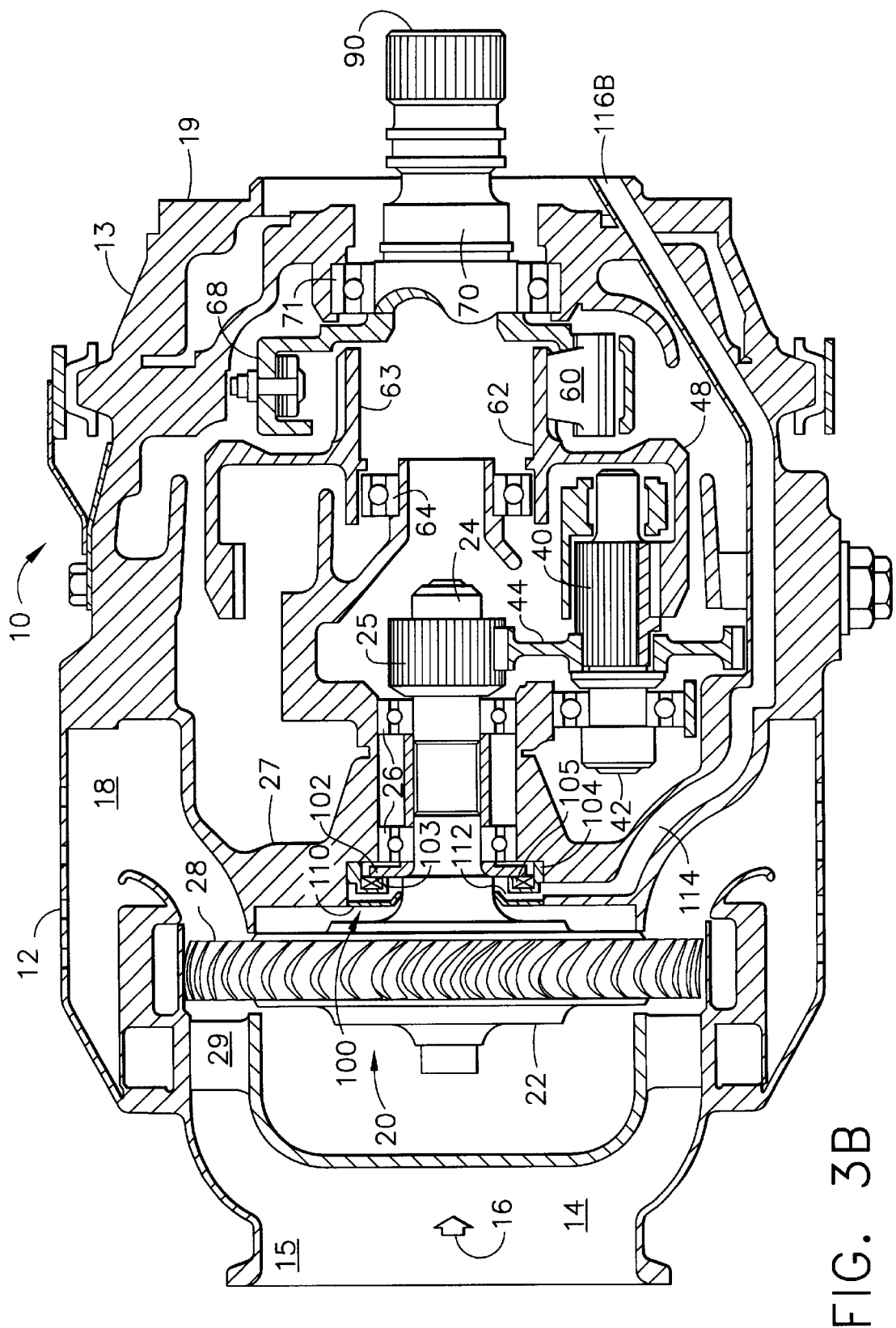
Figure 3C:
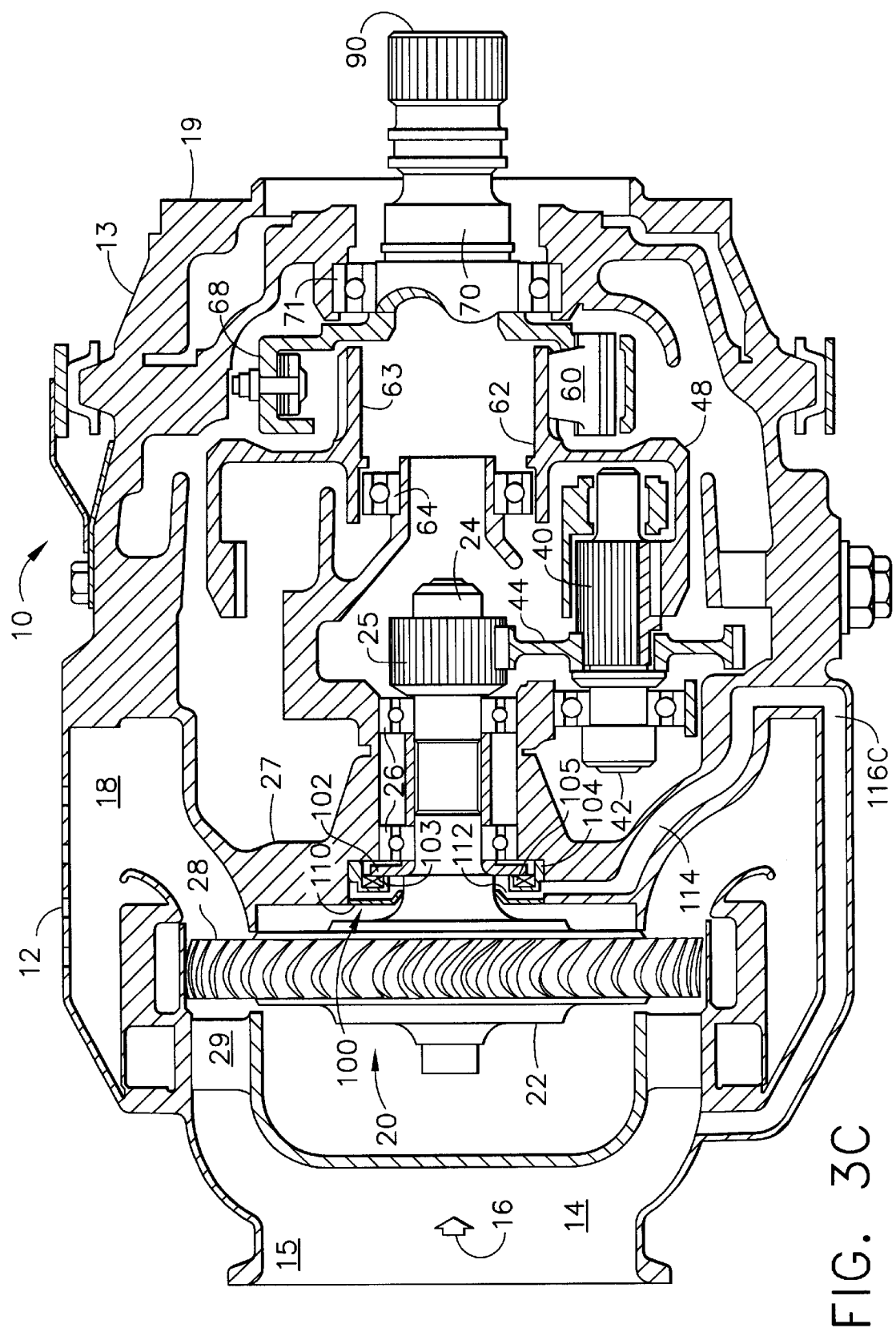
Figure 3D:
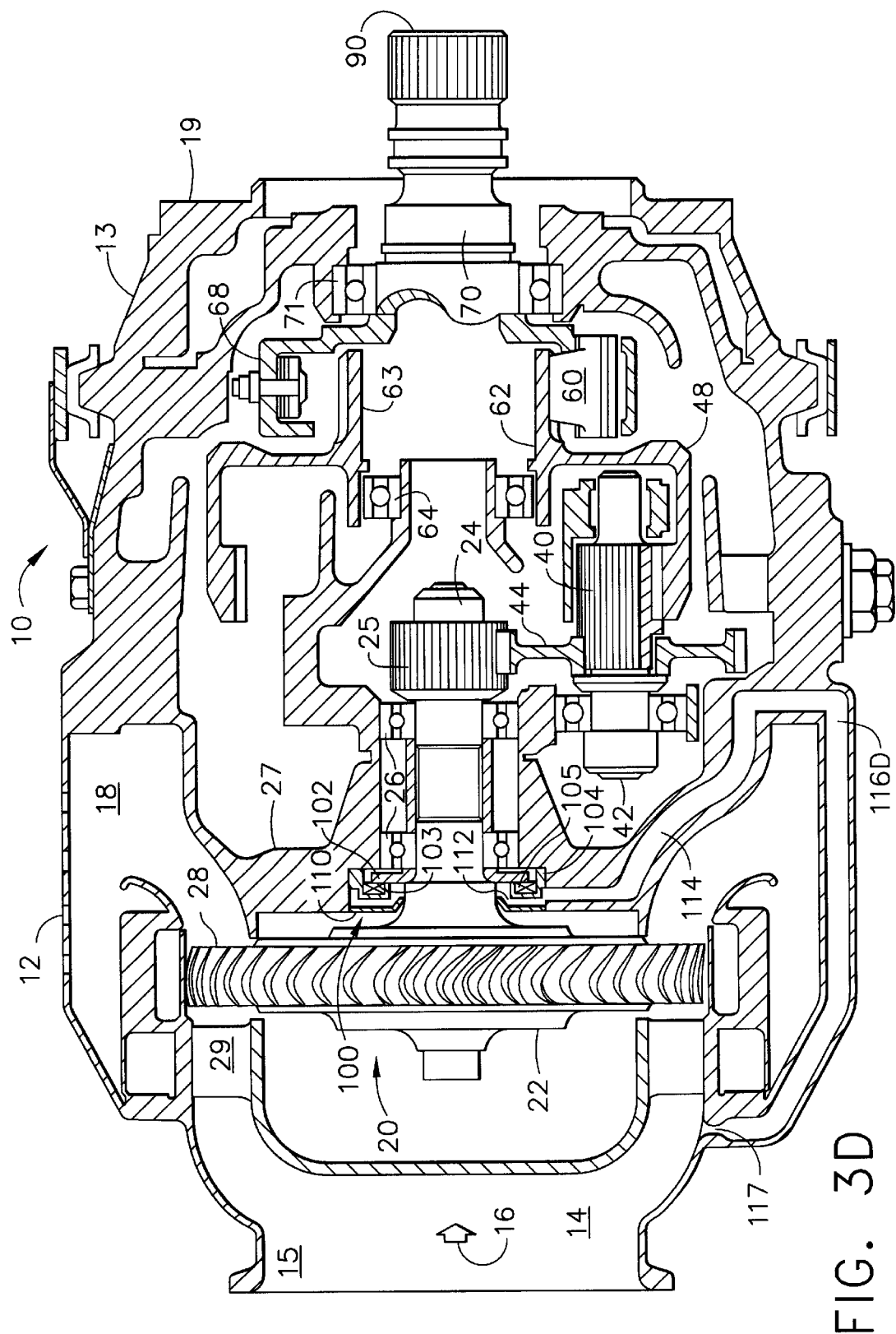

Referring to FIG. 3, a turbine seal assembly 100 includes a face seal having a rotor 102 mounted to shaft 24 adjacent a bearing 26. The rotor 102 has an axially facing flange 103. The face seal further includes a stator 104 mounted to turbine exhaust housing 27. Disposed between the rotor 102 and the stator 104 is a carbon seal ring 105 that sealingly engages the flange 103. The assembly 100 further includes an air-to-air seal 110 disposed on the air side of the stator 104 and axially spaced therefrom to define an annular chamber 112. The air-to-air seal 110 is typically a non-contacting clearance gap type seal and extends radially inwardly from the turbine exhaust housing 27 to a radially inner tip that seals against a radially outward facing surface of the wheel 22. In the preferred embodiment, the seal 110 is a labyrinth seal with the inner tip being a single knife-edge. In alternative embodiments, the inner tip could be a multiple knife edges with or without abradeable contact zones 120 such as honeycomb or soft plasma sprayed high porosity coatings. In other embodiments the seal 100 can be a lip seal 110A (FIG. 5A), a floating ring seal 110C (FIG. 5C), such as a clearance floating ring seal or an arch bound floating ring seal, static long bushings 110F (FIG. 5F), static short bushings 110E (FIG. 5E), wind backs, either outside diameter or inside diameter contacting piston rings 110B (FIG. 5B), floating rotating free rings, brush seals 110D (FIG. 5D), or face seals. These seals can be oriented in either the radial or axial plane. If a lip seal is used it should be a contacting seal where the contact lip is allowed to abrade to a line-to-line fit to a clearance after rotation of the turbine wheel. The lip seal may be filled with polytetrafluoroethylene, nylon or plastics, or rubber.

Figure 3E:
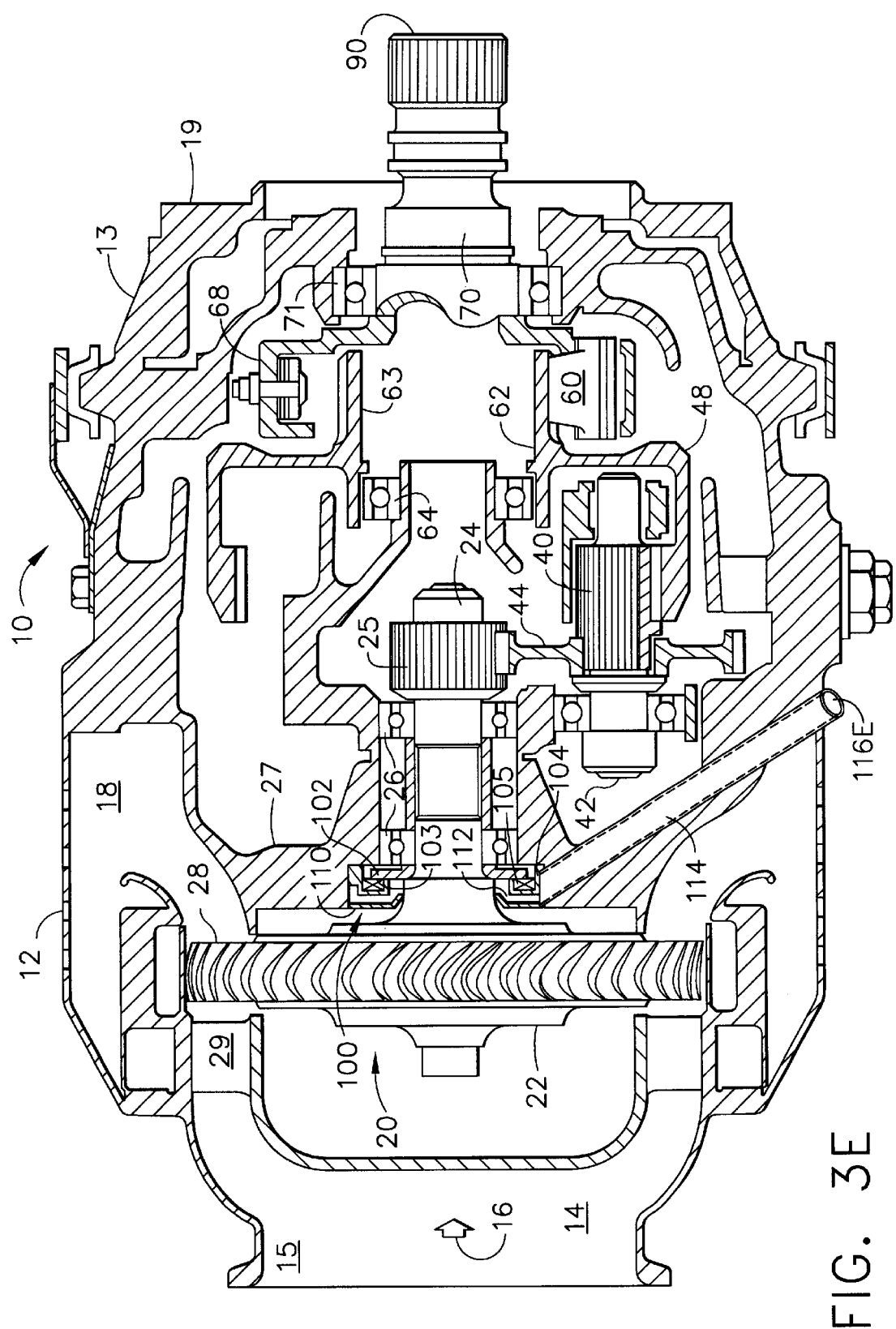
Figure 4:
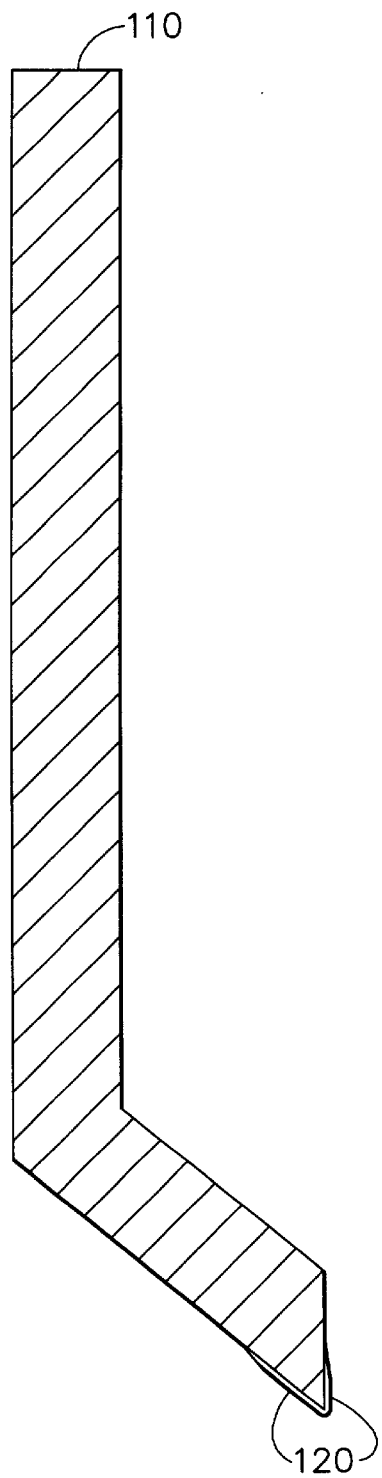
FIG. 4 is a partial cross-sectional view of the air-to-air seal of the seal assembly contemplated by the present invention.

Air is brought to chamber 112 through a flow passage 114. In the preferred embodiment, the inlet 116 of the passage 114 receives ambient air surrounding the air turbine starter 10. Alternatively, the inlet 116A can be located in the exhaust duct 18 (FIG. 3A) or at the flange 19 where the starter 10 is coupled to the engine (116B, FIG. 3B). In another embodiment, high pressure from duct 15 can be directly ducted to the inlet 16 (116C, FIG. 3C), or the pressure in the air can be regulated with a reduction orifice 117 (FIG. 3D) or pressure regulated air supply. The flow passage 114 can be formed in a number of ways such as by tubing 114A (FIG. 3E), annular passages, or cast-in chambers and/or tubes (FIGS. 3 and 3A–3D). Importantly, the flow area of the flow passage 114 needs to be larger than the maximum flow area of the air-to-air seal 110 so that the acceleration of the air at the air-to-air seal absorbs the turbine wheel disk centrifugal pressure generation leaving no differential pressure across the face seal. Preferably, the flow area of the flow passage 114 is at least three times larger than the flow area of the air-to-air seal 110.

The redundant air-to-air turbine seal assembly 100 reduces the system's sensitivity to flaws in the turbine seal by eliminating the differential pressure across the seal. Because the chamber 112 provides a buffer section separating the differential pressure from the turbine wheel pumping from the turbine seal, if the seal develops a flaw (due to coke build up on the contact face or grain pull out from the carbon face) the seal leakage is low even with the two faces of the face seal separate. The elimination of the differential pressure across the seal also reduces the pressure loading of the carbon face or eliminates the requirement for a more expensive and larger envelope package pressure balanced carbon face seal.

Various modifications and alterations to the above-described preferred embodiment will be apparent to those skilled in the art. For example, the present invention can be used with other gas turbine engine configurations. Accordingly, these descriptions of the invention should be considered exemplary and not as limiting the scope and spirit of the invention as set forth in the following claims.

What is claimed is:

1. An air turbine starter comprising:
   a housing defining an inlet, an outlet, and a flow path communicating said inlet with said outlet for conveying a flow of pressurized air therebetween;
   a turbine disposed in said flow path and having a turbine shaft extending therefrom journaled for rotation to said housing by at least one lubricated bearing, said turbine converting the pressure energy of said pressurized air to shaft power;
   an output shaft journaled by said housing for transmitting said shaft power externally of said starter;
   a gear train coupling said turbine with said output shaft, said gear train including a one-way overrunning clutch transmitting torque to said output shaft and preventing back driving from said output shaft to said geartrain; and
   a seal assembly disposed between said lubricated bearing and said turbine wheel, said assembly comprising a face seal and a labyrinth seal axially spaced therefrom to define an air filled annular chamber therebetween; said labyrinth seal extending radially inward from said housing to a radially inner tip having at least one knife edge that seals against a radially outward facing surface of said turbine shaft.

2. The air turbine starter of claim 1, wherein said inner tip has an abradeable contact zone.

3. The air turbine starter of claim 1, wherein said inner tip has a non-abradeable contact zone.

4. An air turbine starter comprising:
   a housing defining an inlet, an outlet, and a flow path communicating said inlet with said outlet for conveying a flow of pressurized air therebetween;
   a turbine disposed in said flow path and having a turbine shaft extending therefrom journaled for rotation to said housing by at least one lubricated bearing, said turbine converting the pressure energy of said pressurized air to shaft power;
   an output shaft journaled by said housing for transmitting said shaft power externally of said starter;
   a gear train coupling said turbine with said output shaft, said gear train including a one-way overrunning clutch transmitting torque to said output shaft and preventing back driving from said output shaft to said geartrain;
   a seal assembly disposed between said lubricated bearing and said turbine wheel, said assembly comprising a face seal and a non-contacting seal axially spaced therefrom to define an air filled annular chamber therebetween; and
   a flow passage having an exit fluidly communicating with said chamber and an inlet fluidly communicating with a source of air.

5. The air turbine starter of claim 4 wherein said flow passage inlet is a hole in said housing.

6. The air turbine starter of claim 4 wherein said flow passage inlet fluidly communicates with a turbine exhaust duct in said air turbine starter.

7. The air turbine starter of claim 4 wherein said flow passage inlet fluidly communicates to where said starter is externally coupled.

8. The air turbine starter of claim 4 wherein said flow passage inlet fluidly communicates with a duct delivering pressurized air to said turbine.

9. The air turbine starter of claim 4 wherein said flow passage has a reduction orifice.

10. The air turbine starter of claim 4 wherein said flow passage comprises tubing.

11. The air turbine starter of claim 4 wherein said flow passage is comprised of cast-in passages.

12. An air turbine starter comprising:
- a housing defining an inlet, an outlet, and a flow path communicating said inlet with said outlet for conveying a flow of pressurized air therebetween;
- a turbine disposed in said flow path and having a turbine shaft extending therefrom journaled for rotation to said housing by at least one lubricated bearing, said turbine converting the pressure energy of said pressurized air to shaft power;
- an output shaft journaled by said housing for transmitting said shaft power externally of said starter;
- a gear train coupling said turbine with said output shaft, said gear train including a one-way overrunning clutch transmitting torque to said output shaft and preventing back driving from said output shaft to said geartrain; and
- a seal assembly disposed between said lubricated bearing and said turbine wheel, said assembly comprising a face seal, a non-contacting seal axially spaced therefrom to define an air filled annular chamber therebetween and a flow passage having an exit fluidly communicating with said chamber and an inlet fluidly communicating with a source of air.

13. The air turbine starter of claim 12 wherein the flow area of the flow passage is at least three times larger than the flow area of said non-contacting seal.

14. The air turbine starter of claim 13 wherein said non-contacting seal is a labyrinth seal with at least one knife edge.

15. The air turbine starter of claim 14 wherein said face seal comprises a rotor mounted to said turbine shaft and having an axially facing flange, a stator mounted to said housing; and a carbon ring seal mounted to said stator for sealingly engaging said axially facing flange.

16. A seal assembly for sealing between a rotating member and a stationary housing comprising:
- a face seal having a rotor mounted to said rotating member and a stator mounted to said housing; and
- a labyrinth seal extending radially inwardly from said housing to a radially inner tip having at least one knife edge that seals against a radially outward facing surface of said rotating member, said labyrinth seal axially spaced from said face seal to define an annular chamber therebetween.

17. The seal assembly of claim 16 wherein said inner tip has an abradeable contact zone.

18. The seal assembly of claim 16 wherein said inner tip has a non-abradeable contact zone.

19. The seal assembly of claim 16 wherein said chamber is filled with air.

20. The seal assembly of claim 19 further comprising a flow passage for delivering said air to said chamber.

21. The air turbine starter of claim 4 wherein the non-contacting seal is one of a knife labyrinth, a lip seal, a floating ring seal, a short static bushing, a long static bushing, a contacting piston ring, a brush seal, or a face seal.

22. The air turbine starter of claim of 12 wherein the non-contacting seal is one of a knife labyrinth, a lip seal, a floating ring seal, a short static bushing, a long static bushing, a contacting piston ring, a brush seal, or a face seal.

23. The air turbine starter of claim 15 wherein said face seal is positioned adjacent said lubricated bearing.

* * * * *